United States Patent [19]

Pshtissky et al.

[11] Patent Number: 5,019,905
[45] Date of Patent: May 28, 1991

[54] ENCODING AND DECODING OF MULTIPLE VIDEO SOURCES

[75] Inventors: Yacov Pshtissky, Bayside; Shiyang Gao, Uniondale, both of N.Y.

[73] Assignee: Vicon Industries, Inc., Melville, N.Y.

[21] Appl. No.: 99,148

[22] Filed: Sep. 18, 1987

[51] Int. Cl.$^5$ .............................................. H04N 7/08
[52] U.S. Cl. ................................... 358/146; 358/142; 358/108; 358/172
[58] Field of Search ............... 358/141, 142, 146, 147, 358/108, 181, 172, 171; 360/9.1, 10.1, 18, 24, 27, 35.1

[56] References Cited

U.S. PATENT DOCUMENTS

| | | | |
|---|---|---|---|
| 2,911,467 | 11/1959 | Donnay | 358/181 |
| 3,558,815 | 1/1971 | Banks | 358/181 |
| 3,686,434 | 8/1972 | Lemelson | 358/108 |
| 3,749,831 | 7/1973 | Simpkins | 358/147 |
| 4,001,881 | 1/1977 | Folsom | 360/35.1 |
| 4,051,524 | 9/1977 | Baxter | 358/108 |
| 4,198,656 | 4/1980 | Mathisen | 360/35.1 |
| 4,302,776 | 11/1981 | Taylor et al. | 358/160 |
| 4,308,559 | 12/1981 | Schiff | 358/181 |
| 4,561,020 | 12/1985 | Matsuda | 358/146 |

FOREIGN PATENT DOCUMENTS 0040370 4/1981 Japan .................................. 360/35.1

OTHER PUBLICATIONS

"IEEE Standard Dictionary of Electrical and Electronics Terms", Third Edition, 1984, p. 75.

Primary Examiner—James J. Groody
Assistant Examiner—David E. Harvey
Attorney, Agent, or Firm—Darby & Darby

[57] ABSTRACT

A system for encoding selected signal position information from a plurality of video signal sources onto the video signals and for selecting a predetermined one of the signals for display by decoding the encoded information. The encoding portion encodes input signal position information in serial pulse form on the back porch of the respective video signal. An alphanumeric character may also be mixed into the encoded signal. A single output line provides, in sequence, the encoded video signal of each input position. The encoding portion also changes each input video signal to a zero blanking level. The encoded output signal may either be supplied directly to the decoding portion or may be recorded and played back into the decoder. The decoding portion selects a particular signal for display by decoding the encoded information and comparing it to a preset number. When this comparison indicates equality, a gating signal is provided which releases digitally stored video information related to that position to an output digital to analog converter. The output of the converter is supplied to a video monitor.

24 Claims, 12 Drawing Sheets

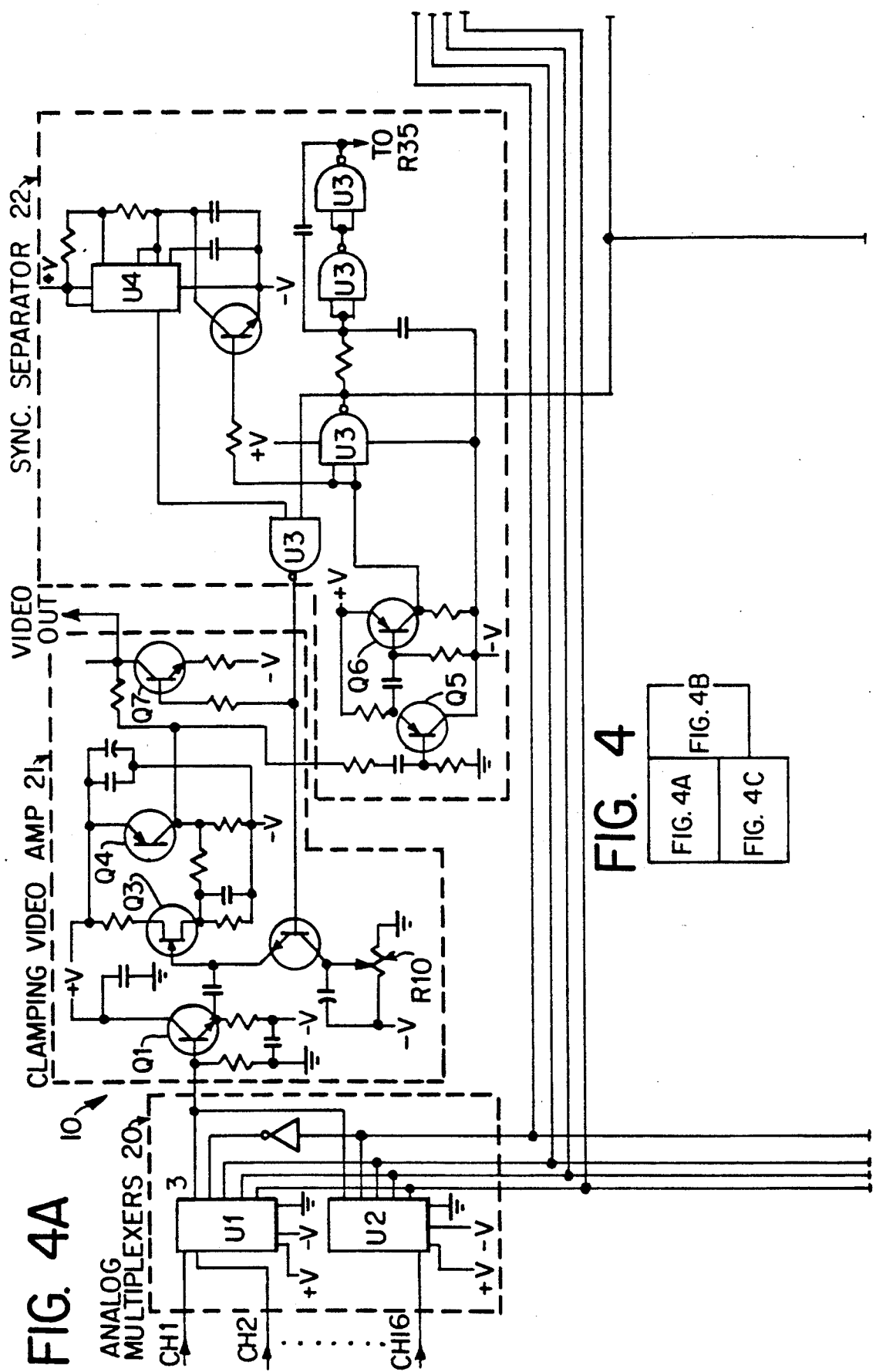

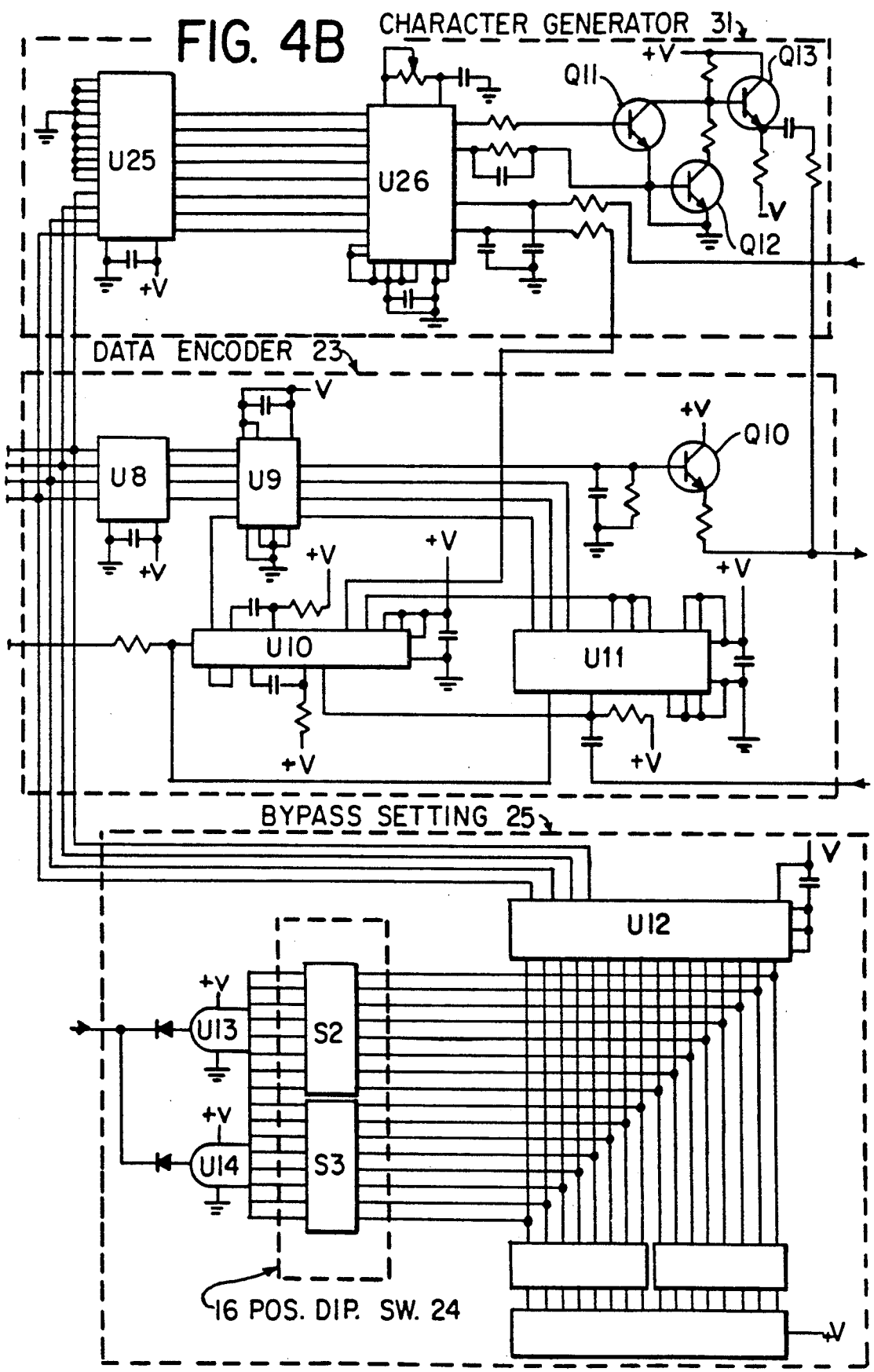

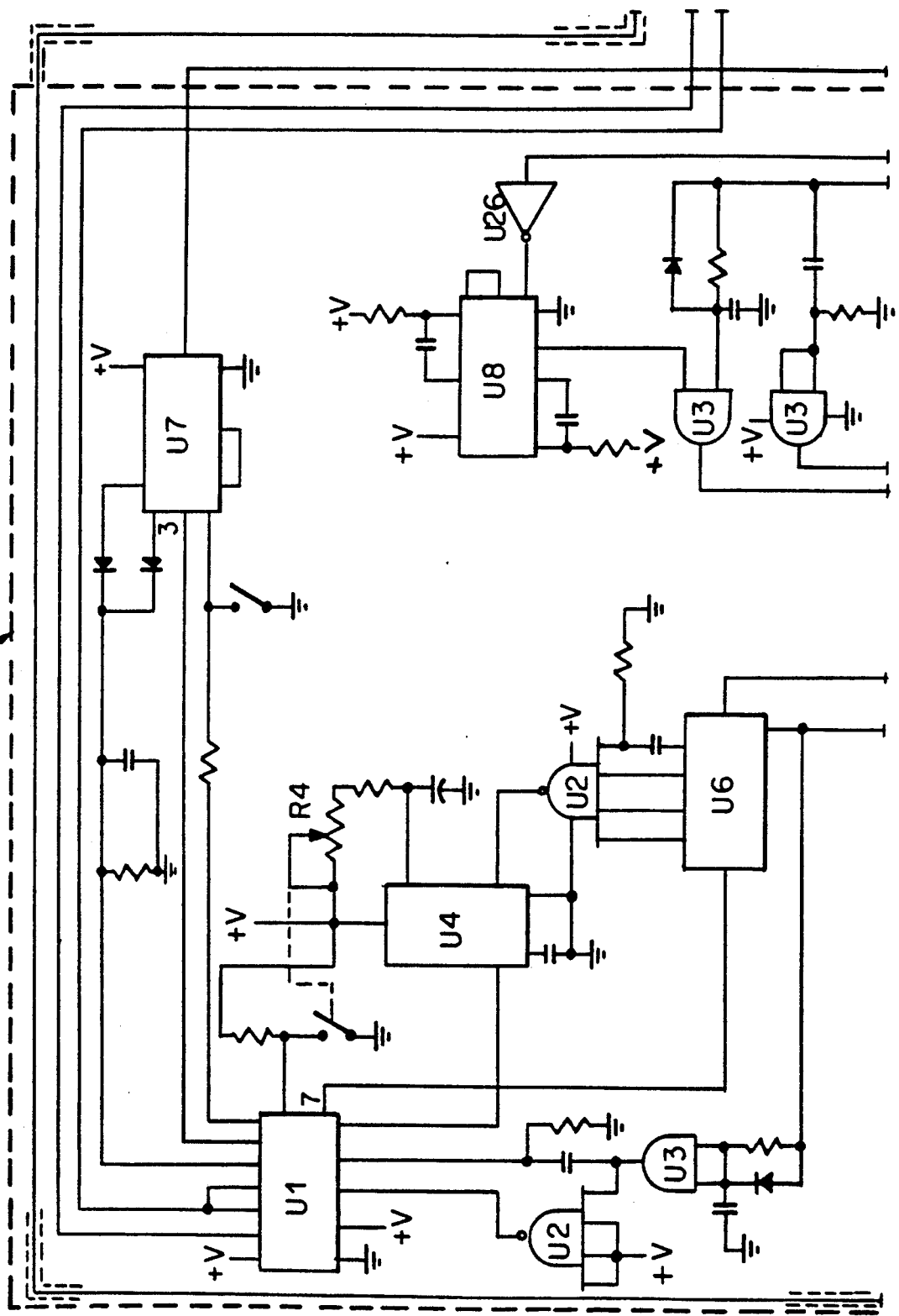

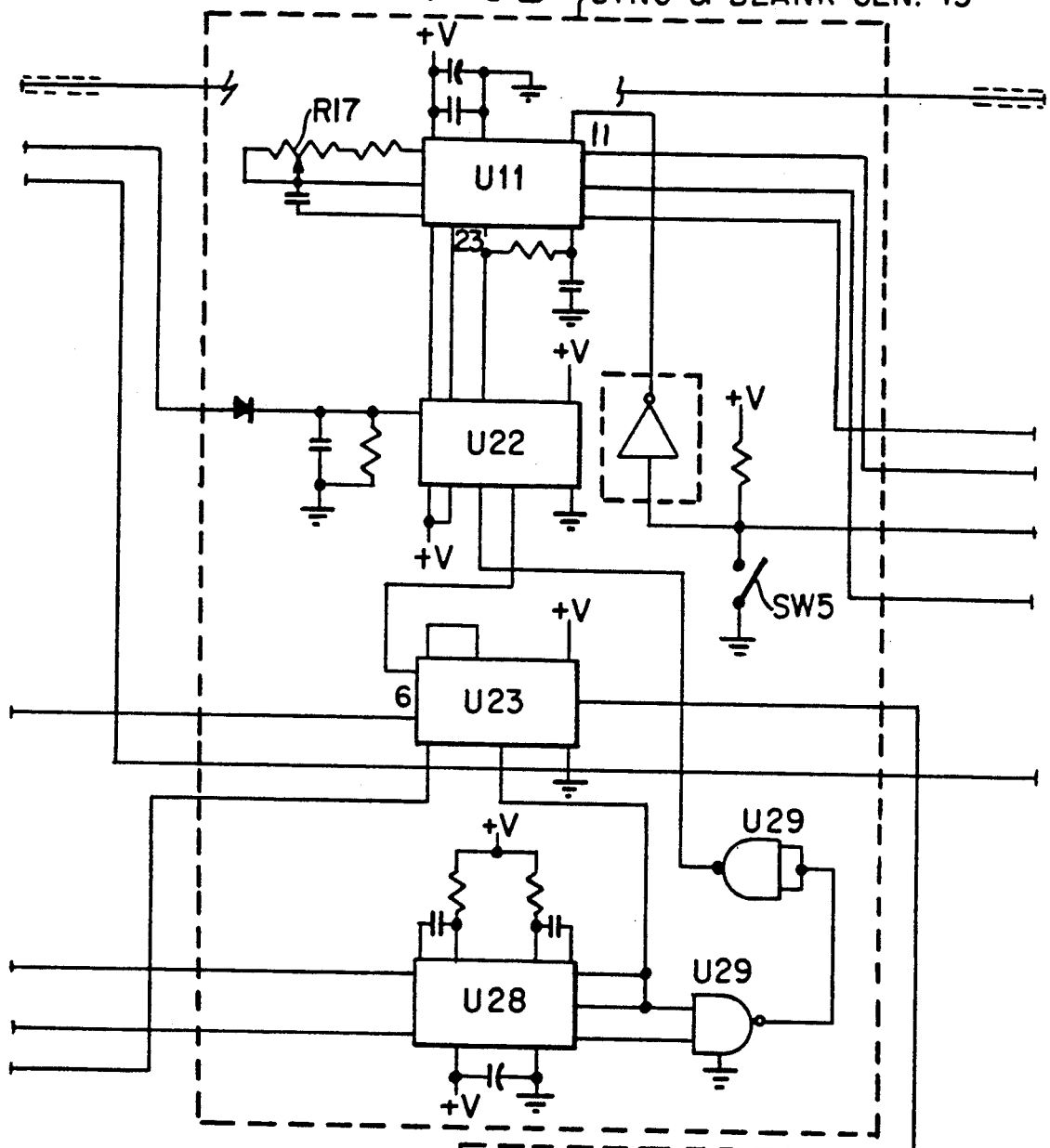
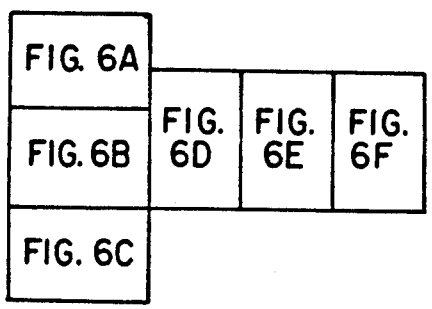
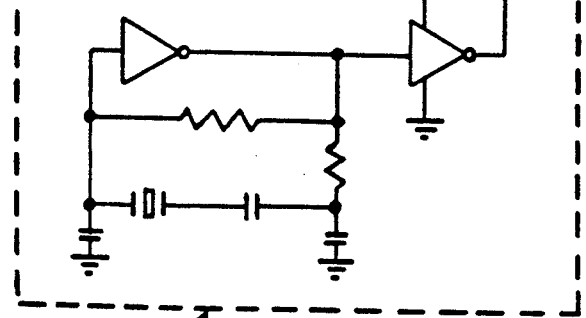

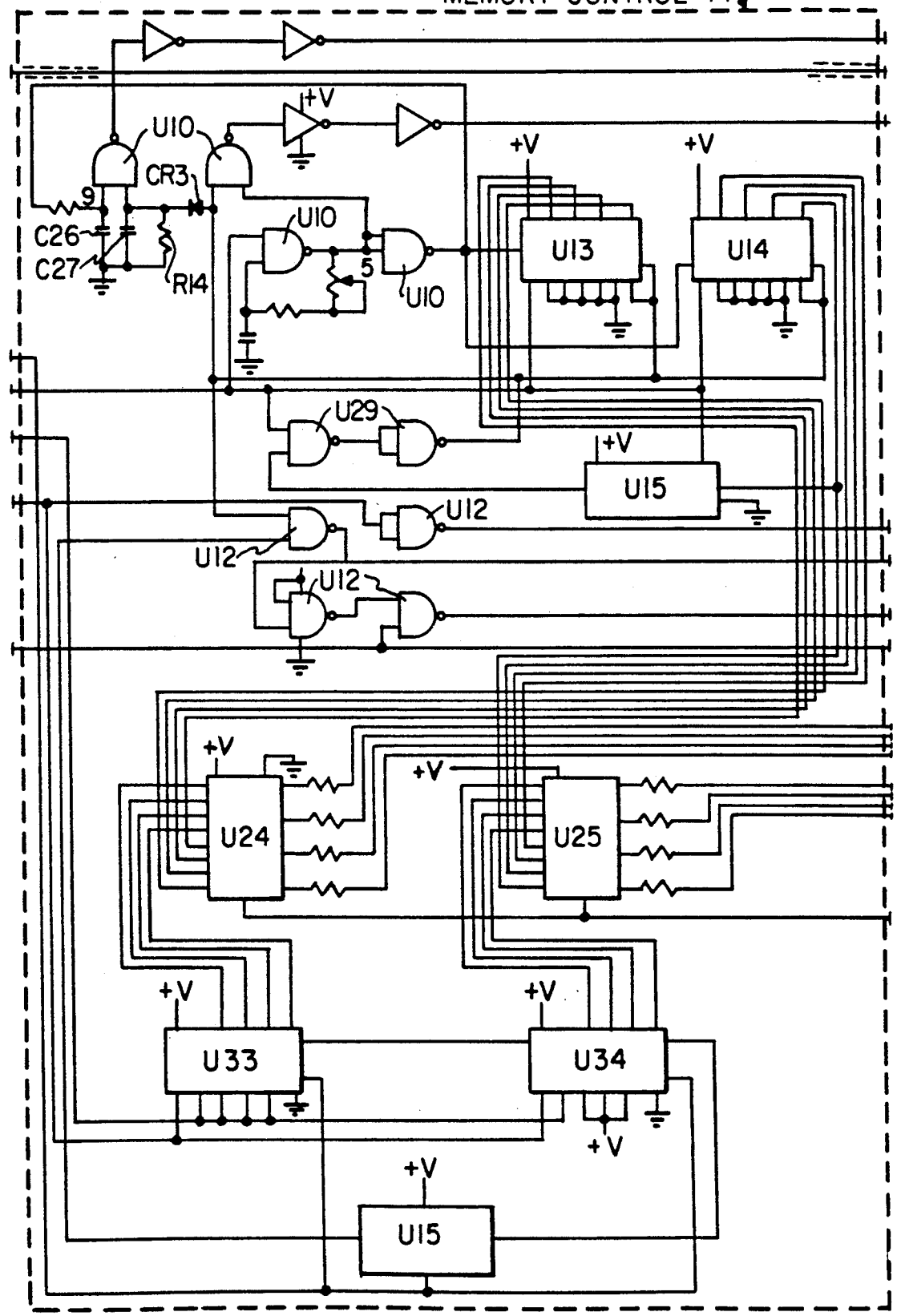
FIG. 6E  HV ADDRESS C'T'R & MEMORY CONTROL 44

ENCODING AND DECODING OF MULTIPLE VIDEO SOURCES

BACKGROUND OF THE INVENTION

1. Field of the Present Invention

The present invention relates to the encoding and decoding of multiple video sources and, in particular, the use of such encoding and decoding in the recording and recovery of video information in television surveillance systems.

2. Background Prior Art

In closed circuit television systems (CCTV) used for surveillance or scene monitoring purposes, it is known to employ a number of television cameras which are directed at different scenes. These scenes may be recorded by individual video recorders for each camera input and the recorded scenes are then available for review from each of the various recorders.

It is accordingly an object of the present invention to eliminate the need to provide multiple recorders for the recording of multiple video camera information.

It is another object of the present invention to provide a system for recording information by multiplex from a large number of camera inputs on a single video tape.

It is a further object of the present invention to electronically encode information relative to each specific camera source on the video signal "back porch" and to use such encoded information for the recovery and playback of selected camera source video information.

It is yet another object of the present invention to improve the encoding of video information from multiple sources on a single video tape and to also improve the decoding and playback of selected video information so as to increase the number of sources such system can handle, to allow various control capabilities in the selection of playback information and to generally reduce the production cost of such system.

SUMMARY OF THE PRESENT INVENTION

In accordance with the present invention, a system for encoding and decoding multiple video sources comprises an encoder and a decoder. The encoder includes means for receiving a plurality of n video input signals, each signal having a back porch. Matrix switching means are included in the encoder which are responsive to the video input signals for sequentially switching from one video input signal to the next upon command and for sequentially providing each of the signals as an output. Counting means are also included in the encoder which are responsive to the n video signals for providing a command to the matrix switching means to cause it to switch from one video signal to the next. The encoder also includes encoding means responsive to the counting means for encoding onto the back porch of the video signal being processed a number of pulses corresponding to which of the n video signals is being processed so as to provide an encoded video signal. The encoder includes means for providing the encoded video signal as an output.

The system also includes a decoder responsive to the encoded video signal and means for extracting the encoded information from the encoded video signal and means for comparing the extracted encoded information with a preselected number chosen from the sequence 1, 2, 3, 4 ... n, the preselected number corresponding to a particular video input signal desired to be displayed and for generating a gating signal when the extracted encoded information agrees with the preselected number. Means are included in the decoder which are enabled by the gating signal for storing in digital form a video signal corresponding to the preselected number. Output means are included in the decoder which are responsive to the stored video signal for providing the selected video signal in analog form to a video display.

The system may also include a video recorder for recording the encoded video signal from the encoder and for supplying the encoded video signal after recording to said decoder.

In the context of the present invention the term "back porch" is synonymous with the vertical blanking interval of the video signal.

For a better understanding of the invention, reference is made to the following description and accompanying drawings while the scope of the invention will be pointed out by the appended claims.

DESCRIPTION OF THE PREFERRED EMBODIMENTS

Figure 1:
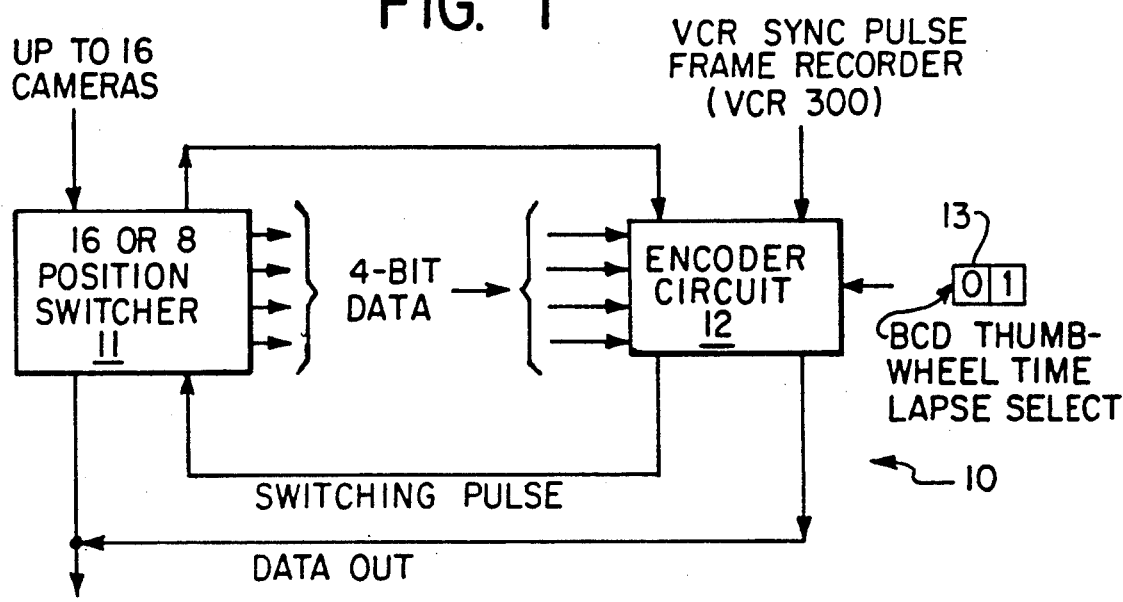
FIG. 1 represents in schematic form a block diagram of the encoder operation of the present system.

Referring initially to FIG. 1, an encoder 10 in accordance with the present invention is shown. The encoder contains a multiple position switcher 11 which receives video information from a number of sources (e.g. television cameras) and switches them upon receipt of a switching pulse. The switching pulse is provided by an encoding circuit 12. the switcher 11 provides 4 bit binary coded data relative to the particular switching position to the encoding circuit 12. The encoder circuit operates to insert the binary coded video source information onto the "back porch" of the recorded video signal.

The encoding circuit 12 is responsive to a sync pulse (e.g., from a VCR frame recorder) and to a BCD signal provided by a 2 digit thumbwheel switch 13. Switch 13 allows the dwell time of the switches to match exactly the time lapse of the VCR recording.

More particularly, the switcher 11 strips the vertical sync pulses from the incoming video signal while the encoder circuit 12 counts the pulses and continuously matches them to the setting on the thumbwheel switch. When the number of pulses matches the thumbwheel switch setting, a pulse is returned to the switcher 11 causing it to switch to the next video position. The procedure is repeated through the entire sequence (e.g., 8 or 16 positions). As each video position is switched, a video signal with four binary data lines is fed to the encoder position, thereby specifying the video switch position. These data are then converted to serial pulses which are encoded on the video back porch. This information, along with the video, is recorded onto the VCR, and can be viewed on a record video monitor by "rolling" the picture using the vertical hold control and observing the raster. Alpha-numeric identification signals can also be mixed into the video.

Figure 2:
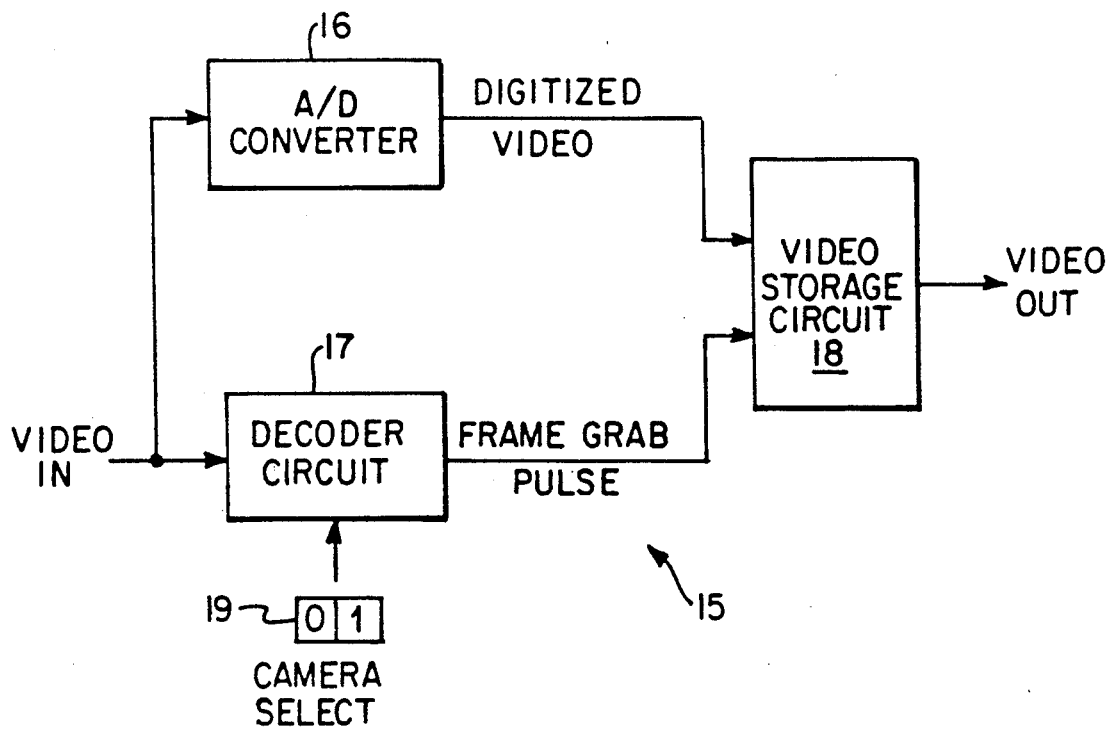
FIG. 2 illustrates in schematic form a block diagram of the decoder operation of the present system.

Referring to FIG. 2, the decoder 15 operates so as to provide a freeze video display from one of 16 sources at the VCR output during playback. The decoder samples the VCR video output (decoder circuit 17) and generates a gate voltage (frame grab pulse) which is fed to a video storage circuit. The VCR video signal output is also digitized by A/D converter 16, the digitized signal being supplied to the video storage circuit 18. The application of the frame grab pulse to the video storage circuit holds the video picture until the next update. A 2 digit pushwheel (Camsel 19) provides BCD information to determine which camera is to be viewed on the freeze video display monitor.

More particularly, the decoder 15 employs an A/D converter 16 which converts the analog information from the VCR into digital form, the decoder circuit 17 samples or "strips" the encoded pulses from the video back porch, generates a frame grab pulse and sends the pulse to the video storage circuit 18 when the pushwheel setting and the binary value of encoded pulse are equal. The video storage circuit "grabs" or "freezes" the correct picture and stores it. This picture appears on the freeze monitor and is refreshed each time the solid state memory within the video storage circuit is updated by another frame grab pulse.

Figure 3:
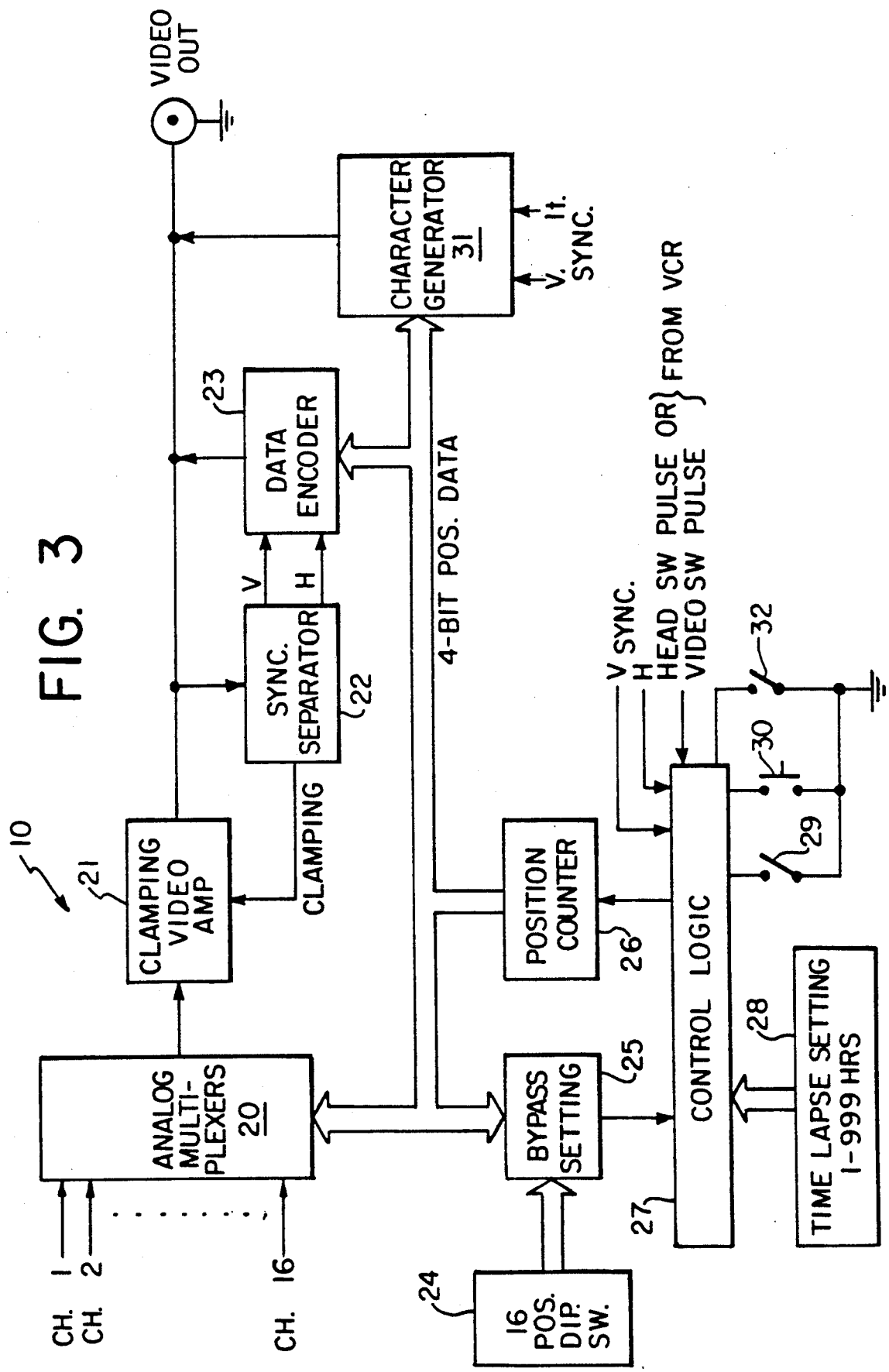
FIG. 3 illustrates in schematic form a more detailed construction of the encoder of the present invention.

Next, reference will be made to the more detailed encoder schematic, FIG. 3. There, the various camera output signals (ch. 1, 2 ... 15, 16) are fed to an analog multiplexer 20. The analog multiplexer acts as a switcher for the various channels. By way of control logic 27, position counter 26 generates 4 bit data corresponding to the position of each signal. These 4 bit position data operate to control the switching of the multiplexer 20. Data encoder 23 accepts the 4 bit position data and inserts it on the video back porch. Character generator 31 also receives the 4 bit position data and generates an appropriate alpha-numeric character for insertion into the output video signal.

The above description represents the basic operation of the encoder. In order to achieve other important functions additional circuitry is included. A clamping video amplifier 21 responsive to a sync separator circuit 22 operates to clamp the output video to an adequate level within two horizontal lines. This is done because input video signals have different D.C. levels. The sync separator 22 generates a vertical and horizontal signal which is supplied to the data encoder 23, character generator 31 and control logic 27. Video switchover (from channel to channel) must occur during the vertical sync to avoid unnecessary distortion. This is controlled by a vertical sync connected to control logic 27.

The encoder 10 provides for intentional bypassing of certain channels (up to 16) controlled by the 16 position dip switches 24 which set by-pass setting circuit 25. By-pass setting circuit 25 also operates automatically to by-pass a missing position if there is no video information in three horizontal cycles.

A time lapse setting arrangement 28, typically a two or three digit BCD-coded thumbswitch (1–999 hours), operates to set the time lapse to match the recording time lapse made on the VCR. The output of the switches is supplied to the control logic circuit 27.

The control logic circuit 27 is also responsive to a pause button control 30 which operates to stop the channel sequencing. The system returns to normal by pushing the switch an additional time or after a one minute period. The control logic circuit 27 is also responsive to alarm switch 29 so as to switch the system to a real time mode when an alarm occurs. The control logic circuit 27 is furthermore responsive to either the video switching pulse from the VCR or the head switching pulse from the VCR to synchronize the sequencing.

It should be noted that the time interval given to each video (from each sequence) is only one frame when the encoder is working in real time (2 hour mode). Therefore, all input video should be vertically phase locked. The dwell time for every video will be the number of fields set by the time lapse mode setting switches 28.

Figure 4C:
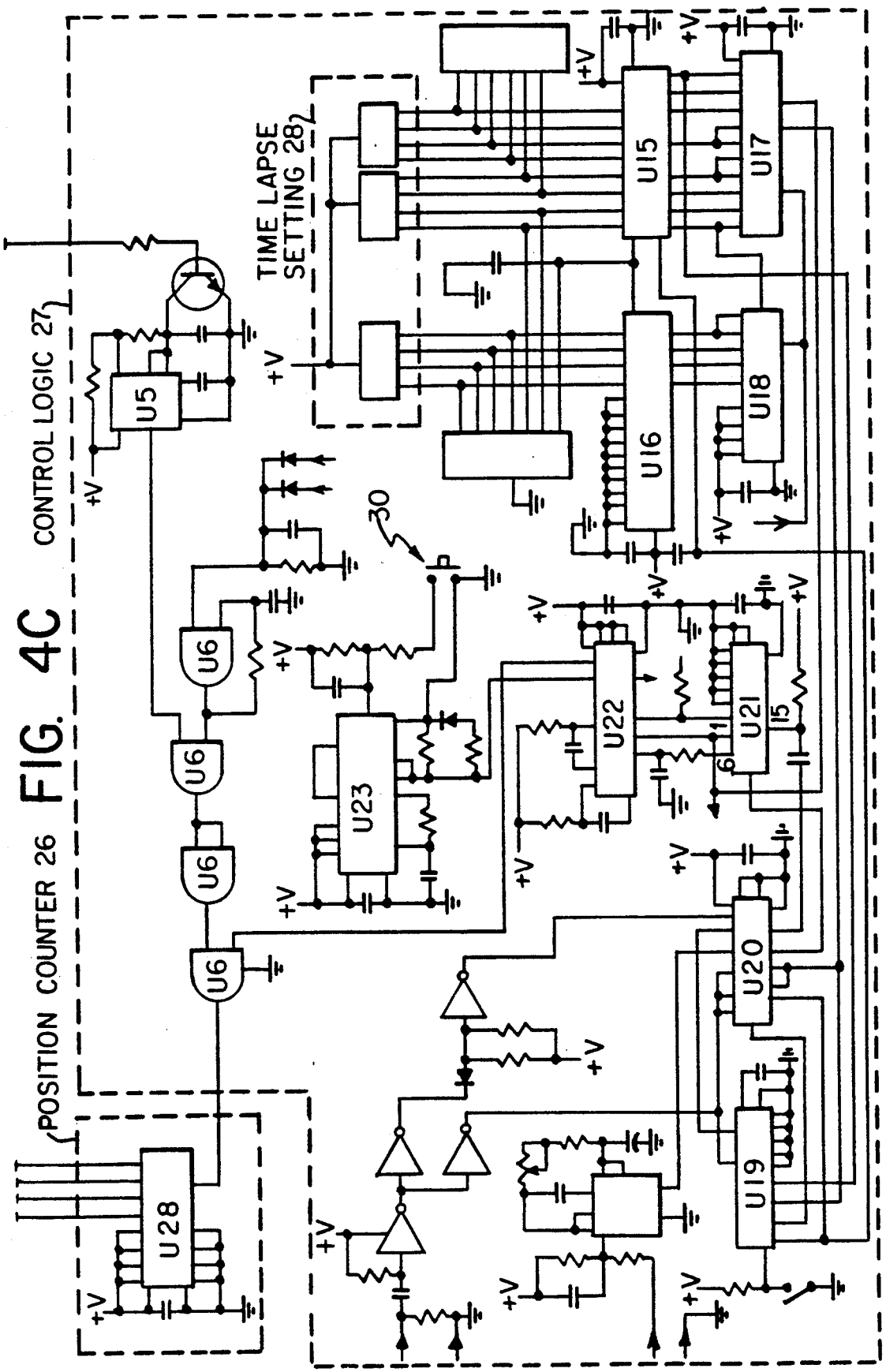
FIG. 4, presented in portions 4A-4C is a detailed schematic of the encoder in accordance with the present invention.

Referring now to the encoder detailed schematic, FIG. 4, $U_1$ and $U_2$ are analog multiplexers, e.g., RCA part CD405-1. They are controlled by 4 bit data from $U_3$, a position counter, typically part 74C00 made by Motorola. The outputs of $U_1$ and $U_2$ at pin 3 are applied to $Q_1$, an emitter follower, then to $Q_3$ and $Q_4$, a video amplifier. Typical part types for these transistors are: e $Q_1 = 2N\,3904$, $Q_4 = 2N3906$, and $Q_3 = J309$. The input to the video amplifier is clamped to a d.c. level set by R10, a potentiometer, by horizontal sync pulses. If the sync is missing because of incoming video level variations, a dummy sync will be generated by $U_4$ (LM555 timer) to assist clamping.

$Q_5$, $Q_6$ and $U_3$ form a sync separator which is connected to the output of the video amplifier since the level variation will be limited at that point.

$Q_5$ and $Q_6$ are typically 2N3906 transistors while $U_3$ is part of a Motorola 74C00. $Q_7$ (typically transistor 2N3904) is turned on by the sync and it pulls down the output to compensate the sync amplitude loss while clamping which is caused by load impedance variation to $Q_1$ when $Q_2$ conducts $Q_2$ is used in the arrangement shown to avoid a high loop gain which may result in oscillation.

The 4 bit position data are decoded to 16 outputs by $U_{12}$ (typically Motorola part 74HC154). If positions of S2 and S3 are set to by-pass, the corresponding outputs of $U_{12}$ will be switched to $U_{13}$ and $U_{14}$ (typically Motorola part 74LS30). A 2MHZ bypass pulse generator, ¼ $U_6$, will then be enabled ($U_6$ is typically a Motorola HC132). Position counter $U_{28}$ will advance to a position which is not by-passed in a negligible time. If a position is scheduled but video is missing for some reason, $U_5$ (National LM555) will generate an Auto Bypass pulse after 2.2 horizontal cycles. No disturbance will be noticed on the decoder side if there is one position missing video.

Normal sequence of the encoder is accomplished by counting pulses from three sources—internal or head switching from the VCR or video switching pulse from the VCR. The real counting pulse is a 1.2 ms pulse generated by $U_{22}$ (typically Motorola part 74HC221) which will be disabled by $U_{23}$ (typically RCA part 74C74) if the pause button is pressed. $U_{23}$ will be reset by an R-C delay (e.g., 1 minute time constant) or by pressing again.

The other half of $U_{22}$ is a non-triggerable, monostable multivibrator for generating a clean (one-shot) vertical pulse at pin 5, which is used as an internal counting source. For internal and head switching mode, the time lapse function is fulfilled by counting up $U_{17}$ and $U_{18}$ (typically Motorola part 74HC390). These counters are reset when position counter $U_{28}$ advances or increments to the next position. The outputs of U and $U_{18}$ are compared with BCD coded switch setting by $U_{15}$ and $U_{16}$ so that, if there is a data match, the output of $U_{15}$ will, through logic multiplexers $U_{19}$ and $U_{220}$ (typically 74HC157 and 74HC-1-53 respectively) be applied to pin 15 of $U_{21}$ (typically Motorola part 74 HC112), to reset half of $U_{21}$. It will be triggered by the next vertical sync pulse applied to pin 1 of $U_{21}$. A falling edge at pin 6/$U_{221}$ will then trigger $U_{22}$ to generate a 1.2 ms counting pulse. R-C network (e.g., 10k × 4700 pfd) is used to delay the switch-over to a second vertical pulse.

If the video switching pulse from the VCR is used, it will take over and control the switch directly through $U_{20}$. If an internal pulse source or head switching pulse is used, the time lapse mode will be switched to real time mode (2 hour mode) for 1 to 5 minutes when an alarm occurs.

$U_8$ to $U_{11}$ encodes video position data onto the back porch of the output video. These are typically parts 74HCTLS04, CD4051, 74HC221 and 74HC161, respectively. $U_8$ inverts 4 bit position data since complement code is preferably utilized throughout. $U_{10}$ generates the required modulated pulse in the back porch period. $U_{11}$ is a line counter which is enabled by one-shot vertical sync. It will stop counting after it counts to 8 so three bits of the output of $U_{11}$ corresponding to 8 lines, will drive $U_9$ to select correct start pulse and position data to pin 3 of $U_9$. $U_9$ is enabled by the output of $U_{10}$, therefore the signal modulated onto the video will be pulses. The pulses are then applied to the video through emitter follower $Q_{10}$ (typically 2N3904). $U_{25}$ and $U_{26}$ (typically Intel part 2716 and National MM58146, respectively) form a character generator for superimposing a position alpha-numeric onto the output video. $U_{25}$ is a PROM for encoding 4 bit binary position data to two digit BCD code data. $U_{26}$ accepts the BCD data and generates the required character image signal. Transistors $Q_{11}$, $Q_{12}$ and $Q_{13}$ (all 2N3904 transistors) function as part of the character generator to supply the required signal to the Video Out.

Figure 5:
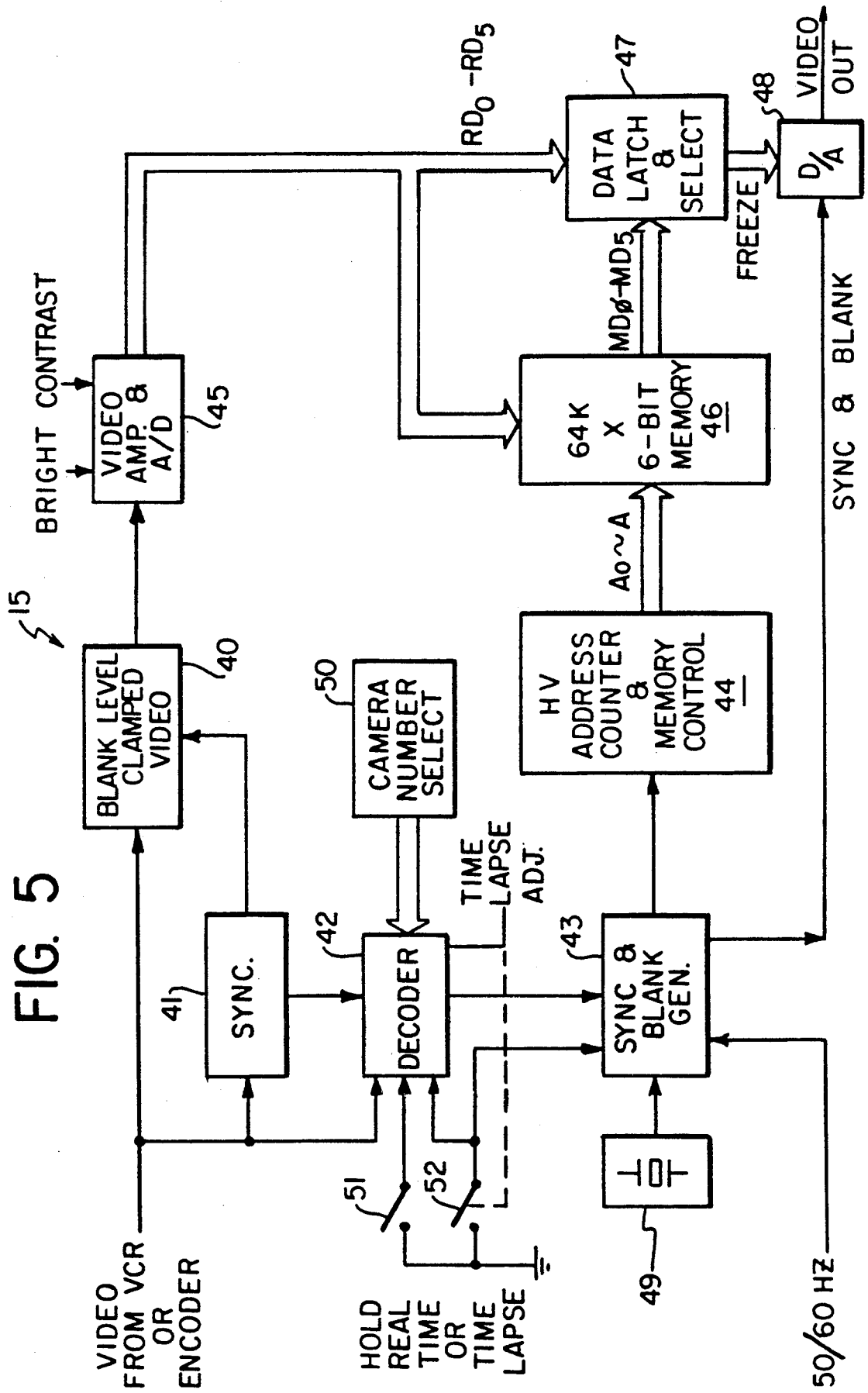
FIG. 5 shows in block schematic form a more detailed construction of the decoder of the present invention.

In FIG. 5, the block arrangement of the decoder 15 is presented, which provides a freeze video display from one of 16 sources at the VCR output. The video signal from a VCR or the encoder is stored in a memory bank (64K × 6 bit memory) 46, after processing by blank level clamped video 40 and Video Amplifier A/D converter 45. The digitized video signal is arranged in the memory by address counter and memory control 44. The memory retains the video information corresponding successively to each of the different camera sources. The output of the memory is applied to data latch and select 47, which either applies the stored information from the memory to the output D/A 48 or applies a signal representing one field of incoming video from video amplifier 45 while the memory 46 is being updated.

The appropriate signals for changing from one camera video source to the next is arranged by decoder 42 and sync 41 and sync and blank generator 43. Decoder 42 picks out the encoded data from the incoming ideo signal. The decoded data is compared with a BCD signal from camera number select 50 and when they are the same, the system enables the memory 46 by way of address counter and memory control 44, to receive digitized video information corresponding to the camera number chosen.

The system operates in two modes, "Time Lapse" and "Real Time", controlled by switches 52 and 51, respectively. Crystal source 49 applies a clock signal for synchronization purposes, black level clamped video circuit 15 operates to clamp the video input signal to a zero blanking level prior to application to video amplifier and A/D converter 45.

Figure 6B:
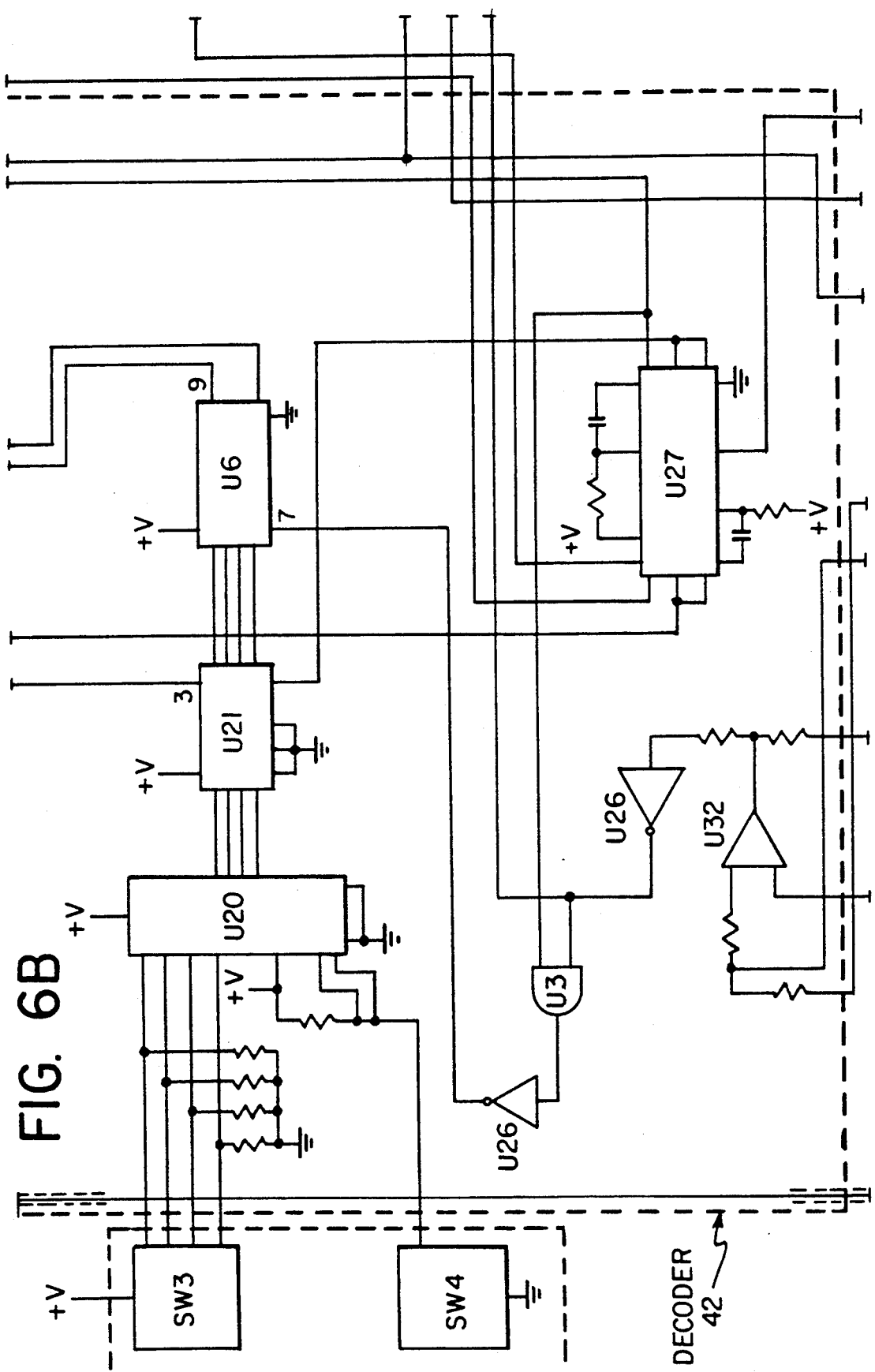
FIG. 6, presented in portions 6A-6F is a detailed schematic of the decoder in according with the present invention.
Figure 6C:
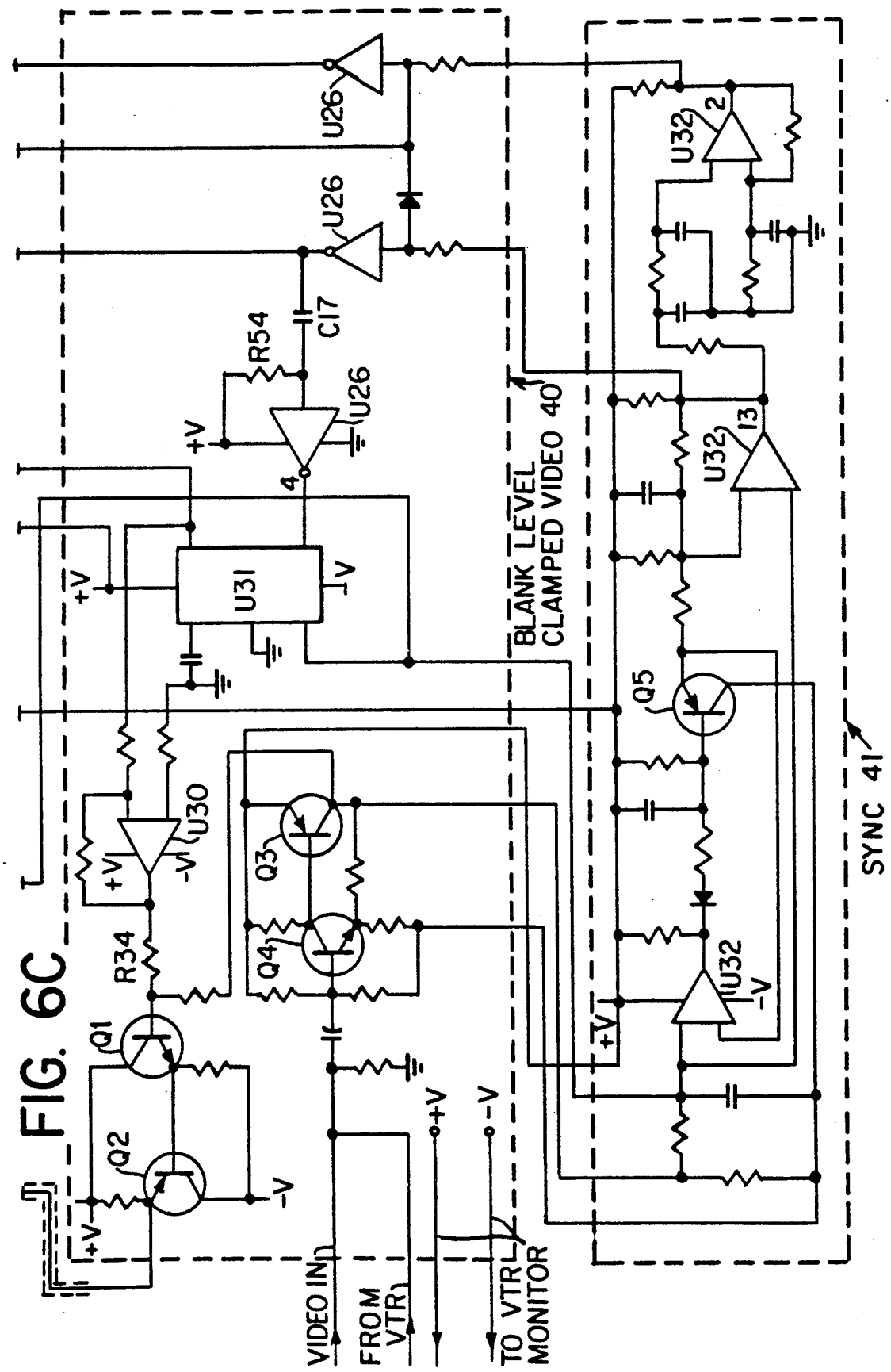
Figure 6F:
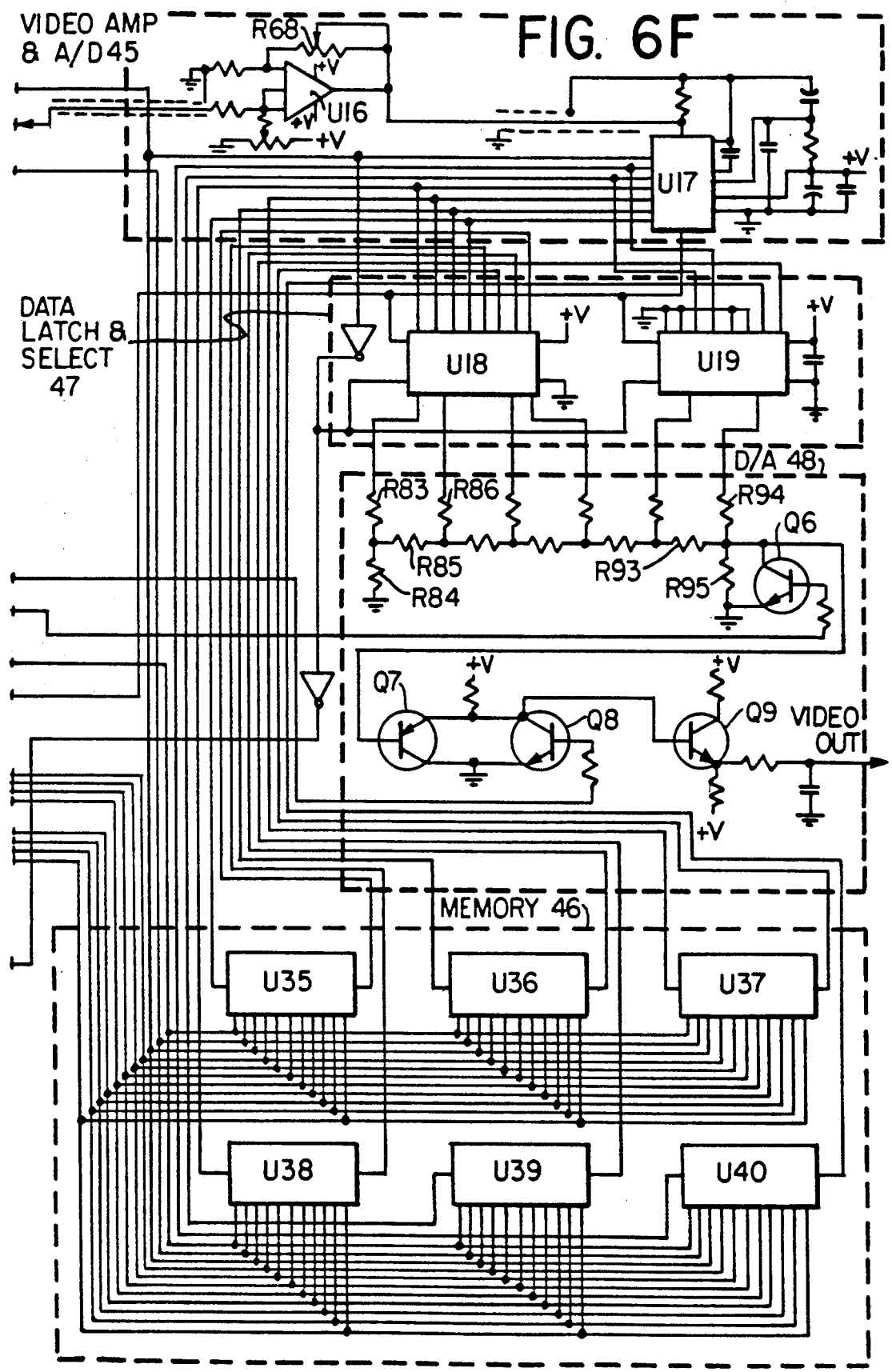

Reference is now made to FIG. 6 for a more detailed discussion of decoder operation and construction.

The incoming video is amplified with a gain of two by transistors Q3 and Q4 (typically 2N3906). The blank level of amplified video will be sampled at the horizontal back porch by U31 (typically a National LF398). U31's output is inverted by U30 (typically a National LM741) and summed with the amplified video through R34 and R35. Therefore, the output of Q1 and Q2 which is then applied to video amplifier U16, will have a zero blank level. The amplified video signal is then applied to an A/D converter, U17 (typically an RCA CA3300). U17 has a d.c. level shift controlled by R72 and an amplitude control adjusted by R68. The signal bandwidth of U16 is DC - 3MHZ which is sufficient for 256 pixels of digitizing video information.

With regard to synchronization, one quarter of U32 (typically a National LM339) holds the negative peak of the sync bottom, and the other two quarters provide H and V sync as outputs at pin 13 and pin 2 respectively. Together with C17 and R54, differential circuit U26 (typically a National 74C04) outputs sample pulse at pin 4. H and V sync signals then trigger U28 (typically a Motorola 74LS221) a dual non-retriggerable monostable to generate a clean sync combined by 2 nand gates of U29 (typically a Motorola 74HC00). The clean sync is applied to U11, a sync generator, through U22 (typically a Motorola 74HC157). U11 is working in "Genlock" mode, when the decoder operates in real-time mode or is updating In this mode, U11 generates synchronization signals which are locked to the above mentioned clean sync. when the decoder operates in time-lapse mode, U11 is working in "stand-alone" mode except for updating picture. "Stand-alone" means U11 supplies sync signals by using a crystal oscillating clock applied to pin 23 of U11. U22 controls two modes operation of U11. By closing SW5 and if Y1 is 1.000MHZ, U11 will operate in a 625 line/50 HZ mode. In "Genlock" mode, the clock frequency of one chip oscillator can be adjusted by R17 to optimize operation. Three outputs of U11 are utilized. The H (horizontal) clamp signal at pin 11 is used to synchronize the digitizing clock generator U10 (a 4.8MHZ oscillator).

Composite sync at pin 5 is used as output video sync and V address counter clock. The V drive at pin 9 is used for loading data to the V (vertical) address counter to generate a proper V blank.

Position information is decoded and the freeze picture is updated by comparing encoded position data which has roughly 1V amplitude with a level about 0.4V higher than blank level, the last quarter of U32 (typically a National LM339) picks out encoded data. The first pulse which is the start pulse, triggers half of U23 (typically a Motorola 74 HC74) that is reset by clean V sync. The output of U23 at pin 6 then triggers U27 (typically a Motorola 4538). It generates a pulse with a width of 0.3ms (5 horizontal lines). This pulse then: (a) eliminates picture signal picked up by U32 and enables only complement data applied to pin 7/U6 (typically a Motorola 4015); (b) resets U6 with its rising edge; (c) enables 4 shift pulses applied to pin 9/U6 which are generated by U8 (typically a Motorola 4528) monostable; and (d) enables U21 (typically a Motorola 4585) data comparator.

Therefore, U6 is a shift register which will shift series position data to its parallel outputs. The data will be compared by U21 with a position number set by two digits position select switches SW3 and SW4. BCD code is converted to binary code by U20 (typically an RCA 4008). If data are coincident, a logic "1" will appear at pin 3/U21 (typically an RCA 4585).

In real-time mode, the logic "1" will reset U7 (typically an RCA 4017) and "0" output at pin 3/U7 will start updating. The updating will be finished when next V sync comes which is the clock signal of U7. In timelapse mode, the logic "1" will be shifted into the other half of U6. If 4 consecutive logic "1" pulses are shifted in, the last one will trigger U4 through U2, otherwise U6 will be reset by output at pin 7/U1. U4 is typically a National LM555, U3 is typically an RCA 4081, U2 is typically an RCA 4012, and U1 is typically a Motorola 74HC157. With U4 triggered, after a delay which can be adjusted by R4, U7 will be enabled to count. It will stop counting when it counts up to "3", however "1" and "2" counts are then provided to enable updating and switch U11 from "stand-alone" mode to "Genlock" mode for synchronized updating.

The digitizing and storage operation is now discussed. U17 (typically a CA3300) is a 6 bit flash A/D which is enabled while updating. The 6 bits outputs are then applied to U35–U40 (typically all Intel 51C64L-12), memory bank, and U18, U19 (typically Motorola 74HC298) output data register. U13, U14 and U33, U34 (all typically Motorola 74HC161) are horizontal and vertical address counters. U13, U14 supply 8 bit row address for memory bank and U33, U34 generate 8 bit column address. Row an column address are multiplexed by U24 and U25 (typically a Motorola 74 HC157) according to the timing requirement of the memory chips. U10 (typically a Motorola 74 HC132) is a synchronized oscillator. It generates an approximately 4.8 MHZ clock which corresponds to 256 pixels per horizontal line. The clock signal will: (a) be used as counting pulses for the H address counter; (b) be enabled by the H blank signal and used as a CAS signal for the memory chips; (c) be delayed by R13, C26 and enabled by prolonged H blanking with CR3, R14 and C27 circuit, generate RAS signal for memory chips and generate A/D clock, Data Latch clock for U18, U19 and row/column select signal for U24, U25.

The prolonged enabled signal for RAS is designed to avoid an incomplete read/write cycle which may result in data disturbance stored in one row of memory cells. U15 (typically a Motorola 74HC112), as well as parts of U12, U29 generate H and V blank corresponding to 256 counts. Especially for 50 HZ operation, two additional blanks should be placed on the top and bottom of the monitor screen. The memory bank now has all required signals. With digitized picture data coming from the A/D, 16 bit address multiplexed by U24, U25 applied to 8 bit address pins, proper RAS and CAS signals, the memory bank will store picture data when updating (WE) signal appears. The memory bank will read-out stored picture information the rest of the time.

U18 and U19 are output data registers and play a role as a D/A converter as well. The digital picture data come from two sources. They come from the A/D converter while updating so as to avoid seeing an updating blank. They also come from memory bank and then a frozen picture will be seen. The CMOS OCs drive 10k/5k D/A resistor ladder R83-R94 directly, and output picture information is then acquired across R95. With the blanking signal driving C6 (typically a 2N3904 transistor) and composite sync signal driving Q8 (2N3904 transistor typically), Q9 (typically 2N3906 transistor) outputs the video representing one field of incoming video until next updating.

While the disclosure is directed to the embodiments of the present invention presently known, all those variations of the invention are intended to be covered which are encompassed within its true spirit and scope as would occur to any individual of ordinary skill in the art.

What is claimed is:

1. A system for encoding and decoding multiple video sources comprising:
   an encoder, said encoder including:
   means for receiving n video input signals, where n is an integer greater than 1, each signal including a back porch portion and a sync pulse;
   matrix switching means responsive to said video input signals for sequentially switching from one video input signal to the next in response to a command signal and for sequentially providing each of said n signals as an output;
   counting means responsive to the sync pulses of each of said n vide signals for providing said command signal to said matrix switching means to cause it to switch from one video signal to the next;
   encoding means responsive to said counting means for encoding information onto the back porch portion of each video input signal, said information corresponding to which of said signals is being encoded so as to provide an encoded video signal, said encoder includes means for clamping, the output of said matrix switching means to a zero blanking level irrespective of whether said incoming video signals are synchronized with each other;
   said clamping means operates in response to output sync signals in the output of the switching means when the output sync signals are present and in response to locally generated dummy sync signals when the output sync signals are absent; and
   means providing said encoded video signal as an output;
   a decoder, said decoder responsive to said encoded video signal and including:
   means for extracting said encoded information from said encoded video signal;
   means for comparing said extracted encoded information with a preselected number from the sequence 1... n, wherein n is an integer greater than 1, said preselected number corresponding to a particular video input signal desired to be displayed, and for generating a gating signal when said extracted encoded information agrees with said preselected number;
   means enabled by said gating signal for storing in digital form said particular video signal corresponding to said preselected number; and
   output means responsive to said stored video signal for providing said particular video signal in analog form to a video display.

2. The system of claim 1, wherein said encoder includes means for mixing into the encoded video signal an alphanumeric signal corresponding to which of said n video signals is encoded.

3. The system of claim 1 wherein said encoder includes a plurality of input positions for supplying said input signals and means for permitting selected ones of said input positions to be bypassed by said matrix switching means so that no video signals are supplied from the selected positions.

4. The system of claim 1 wherein said encoder includes means for causing said switching means to switch upon the absence of a predetermined number of lines of video information.

5. The system of claim 1 wherein said encoder includes control means for controlling a lapse of time in switching by said switching means from one video signal to another.

6. The system of claim 1 wherein said matrix switching means, counting means and encoding means are controlled by 4 bit binary coded signals.

7. The system of claim 1 wherein said matrix switching means, counting means, encoding means and mixing means are controlled by 4 bit binary coded signals.

8. The system of claim 3 wherein said matrix switching means, counting means, encoding means and bypass means are controlled by 4 bit binary coded signals.

9. The system of claim 5 including a pause control and wherein said control means is responsive to activation of said pause control to stop the switching of said matrix switching means.

10. The system of claim 5 including an alarm control wherein said control means is responsive to said alarm control to switch said system into a real time mode when said alarm control is actuated.

11. The system of claim 5 wherein said control means is responsive to a head switch pulse or video switch pulse from a VCR to synchronize the sequential switching.

12. The system of claim 1 wherein, in said decoder, said preselected number is provided by at least one numerically indexed switch which provides a binary coded decimal signal corresponding to each index position.

13. The system of claim 12 wherein, in said decoder, said indexed switch is a rotary thumbwheel switch having switch positions 0-9.

14. The system of claim 12 wherein, in said decoder, said indexed switch includes two rotary thumbnail switches each having positions 0-9.

15. The system of claim 12 wherein, in said decoder, said extracted encoded information is converted to 4 bit binary coded form and wherein said binary coded decimal information is converted into 4 bit binary coded form, said comparing means performing said comparison in response to said binary coded signals.

16. The system of claim 3 wherein, in said decoder, said storing means is a digital memory.

17. The system of claim 16 wherein, in said decoder, said digital memory is a 64K×6 bit memory.

18. The system of claim 16 wherein, in said decoder, means are included for converting said video signal into digital form for storage in said storing means.

19. The system of claim 3 wherein, in said decoder, said output means includes means for converting digital information into analog information.

20. The system of claim 16 wherein, in said decoder, means are included for converting said video signal into digital form for storage in said storing means and wherein said output means includes means for converting output digital video information into output analog video information and also including latch means responsive to said storing means and said analog to digital converting means for providing said selected video signal from said storing means or said video signal from said analog to digital converting means during refreshment of said storing means.

21. The system of claim 1 including, in said decoder, means for clamping said encoded video signal to a zero black level and means responsive to said clamped video signal for amplifying said signal.

22. The system of claim 21 including, in said decoder, means for synchronizing said decoder.

23. The system of claim 1 wherein said encoded video signal includes a synchronizing portion and said decoder includes means responsive to said encoded video signal synchronizing portion for synchronizing said decoder.

24. The system of claim 1 also including means for recording the encoded video signal from the encoder and for supplying the encoded video signal after recording to said decoder.

* * * * *